US010257239B2

(12) United States Patent
Liang et al.

(10) Patent No.: US 10,257,239 B2
(45) Date of Patent: Apr. 9, 2019

(54) PACKET SWITCHED VOICE SERVICE REGISTRATION TECHNIQUES WITH REDUCED OVERHEAD

(71) Applicant: Apple Inc., Cupertino, CA (US)

(72) Inventors: Huarui Liang, Beijing (CN); Zhiwei Wang, Beijing (CN); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/030,175

(22) PCT Filed: Jul. 24, 2015

(86) PCT No.: PCT/CN2015/085056
§ 371 (c)(1),
(2) Date: Apr. 18, 2016

(87) PCT Pub. No.: WO2017/015790
PCT Pub. Date: Feb. 2, 2017

(65) Prior Publication Data
US 2017/0171256 A1    Jun. 15, 2017

(51) Int. Cl.
*H04L 29/06*    (2006.01)
*H04W 8/18*    (2009.01)
*H04W 36/00*    (2009.01)
*H04W 36/26*    (2009.01)
(Continued)

(52) U.S. Cl.
CPC .... *H04L 65/1073* (2013.01); *H04L 29/06027* (2013.01); *H04L 65/105* (2013.01);
(Continued)

(58) Field of Classification Search
CPC ............. H04L 65/1016; H04L 65/1069; H04L 65/1006; H04L 65/1073; H04W 36/0022
See application file for complete search history.

(56) References Cited

U.S. PATENT DOCUMENTS

| 9,077,785 B2 | 7/2015 | Shuman et al. |
| 2011/0244836 A1* | 10/2011 | George ............... H04M 3/4234 455/414.1 |

(Continued)

FOREIGN PATENT DOCUMENTS

| CN | 101160887 A | 4/2008 |
| CN | 104113536 A | 10/2014 |
| CN | 104507131 A | 4/2015 |

OTHER PUBLICATIONS

International Search Report and Written Opinion for PCT/CN2015/085056, dated May 4, 2016, 11 pages.

*Primary Examiner* — Kathy W Wang-Hurst
*Assistant Examiner* — Ernest G Tacsik
(74) *Attorney, Agent, or Firm* — Meyertons Hood Kivlin Kowert & Goetzel, P.C.; Jeffrey C. Hood

(57) ABSTRACT

This disclosure relates to techniques for reducing overhead associated with packet switched voice service registration. According to some embodiments, a cellular network entity associated with a cellular network may receive a request relating to packet switched voice service from a wireless device. It may be determined whether subscription information for the wireless device indicates that packet switched voice service from the cellular network is permitted to the wireless device. A response to the request indicating whether packet switched voice service from the cellular network is available to the wireless device may be provided to the wireless device. The response may be generated based at least in part on the subscription information.

15 Claims, 8 Drawing Sheets

(51) Int. Cl.
*H04W 36/36* (2009.01)
*H04W 48/18* (2009.01)
*H04W 60/00* (2009.01)

(52) U.S. Cl.
CPC ...... *H04L 65/1006* (2013.01); *H04L 65/1016* (2013.01); *H04L 65/1046* (2013.01); *H04L 65/40* (2013.01); *H04W 8/18* (2013.01); *H04W 36/0055* (2013.01); *H04W 36/26* (2013.01); *H04W 36/36* (2013.01); *H04W 48/18* (2013.01); *H04W 60/00* (2013.01)

(56) References Cited

U.S. PATENT DOCUMENTS

| | | | | |
|---|---|---|---|---|
| 2012/0039312 | A1* | 2/2012 | Narkar | H04W 8/00 370/338 |
| 2012/0044867 | A1* | 2/2012 | Faccin | H04W 60/00 370/328 |
| 2012/0213152 | A1* | 8/2012 | Hegarty | H04L 65/80 370/328 |
| 2014/0219272 | A1* | 8/2014 | Shuman | H04L 65/1016 370/352 |
| 2014/0376513 | A1 | 12/2014 | Poikselka | |
| 2015/0045025 | A1* | 2/2015 | Lim | H04W 36/20 455/434 |
| 2015/0230094 | A1* | 8/2015 | Bae | H04W 76/18 455/411 |
| 2016/0148673 | A1* | 5/2016 | Lesartre | G11C 7/10 365/189.2 |
| 2016/0374005 | A1* | 12/2016 | Cho | H04W 48/06 |

* cited by examiner

PACKET SWITCHED VOICE SERVICE REGISTRATION TECHNIQUES WITH REDUCED OVERHEAD

FIELD

The present application relates to wireless devices, including to systems, apparatuses, and methods for wireless devices to avoid excessive overhead when attempting to register for packet switched voice services.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Techniques for providing voice call services via wireless communication, including cellular telephony, are widespread in use. There is currently movement towards packet-switched wireless communication techniques for voice call services, such as encompassed by voice over LTE or "VoLTE" techniques.

It is common practice for wireless devices to perform VoLTE registration based on device capability without regard to the characteristics of the subscription of the wireless device. It may thus be possible for a wireless device to receive a positive indication of VoLTE services availability from a cellular network in some instances even if it is not subscribed for such services from the cellular network, and in such instances may receive multiple addresses for proxy call session control functions (P-CSCFs). Such a wireless device could unsuccessfully attempt session initiation protocol (SIP) registration with each P-CSCF listed in the address list. This may result in an excessive amount of signaling overload with the cellular network, and additionally may cause excessive power consumption by the wireless device.

SUMMARY

Embodiments are presented herein of apparatuses, systems, and methods for reducing signaling overhead in conjunction with packet switched (PS) voice service registration.

The techniques described herein may include providing, by a cellular network, an indication to a wireless device that the wireless device is not subscribed to packet switched voice service (e.g., VoLTE service) from the cellular network in response to a packet switched voice service related request, if the wireless device is not subscribed to packet switched voice service from the cellular network.

Such an indication may be provided by a mobility management entity (MME) of the cellular network, for example in response to an attach request or tracking area update (TAU) request that indicates that the packet switched domain is preferred by the wireless device for voice service. For example, instead of providing an IMS voice over packet switched (IMSVOPS) indicator solely based on network capability when accepting attachment from or performing a TAU for a wireless device, the MME might provide an IMSVOPS indicator that is also based on subscriber information for the wireless device. Thus, the MME might provide an IMSVOPS indicator value of 0 if a wireless device is not subscribed to VoLTE services from the network even if the network otherwise supports VoLTE services, as one possibility. As another example, the MME might provide an IMSVOPS indicator value based on network capability, but provide an invalid, void, or dummy P-CSCF address if the wireless device is not subscribed to VoLTE services from the network. The wireless device could be configured to recognize the invalid P-CSCF address as an indication that the wireless device's subscription does not include VoLTE services from the network.

As another possibility, such an indication may be provided by a serving call session control function (S-CSCF), for example in response to an SIP register message. Since the wireless device may not be subscribed to VoLTE services from the network, the S-CSCF may reject such a request, for example using a 403 forbidden response to the SIP register request. As one possibility, a cause code indicating that the wireless device is not subscribed to packet switched voice service from the cellular network may be included with the rejection response, which may in turn allow the wireless device to determine not to attempt further SIP registration requests (e.g., with other P-CSCFs of the cellular network).

Other types of indications, which may be provided by similar or different cellular network entities, are also possible.

A wireless device receiving such an indication may be able to determine to refrain (at least temporarily) from attempting to register for packet switched voice service with the cellular network based on such an indication that the wireless device is not subscribed to packet switched voice service from the cellular network. Note that the wireless device may (at least in some instances) not permanently refrain from further VoLTE registration attempts, and any of various conditions may trigger the wireless device to resume allowing packet switched voice service registration attempts (and/or other packet switched voice service related requests), including but not limited to expiration of a timer, handover to a different cellular network, entering a different tracking area, and/or any of various other possible conditions.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
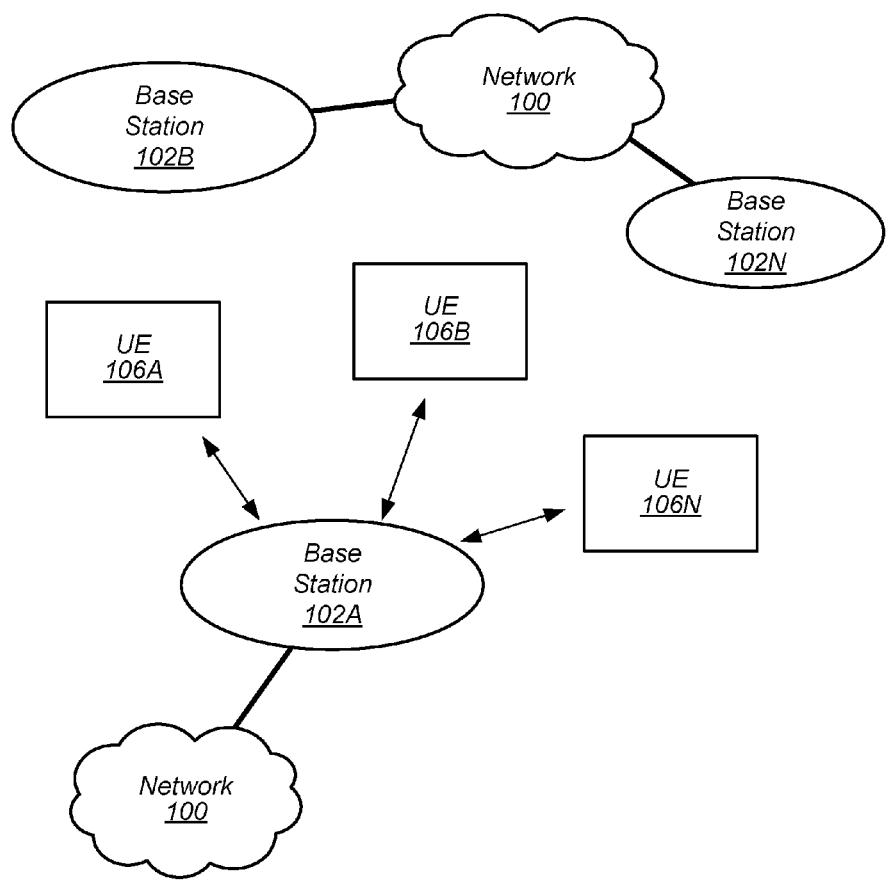
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
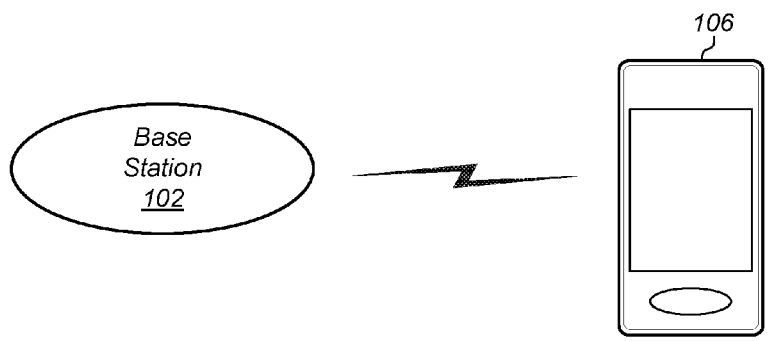
FIG. 2 illustrates a base station ("BS") in communication with a user equipment ("UE") device, according to some embodiments.
Figure 3:
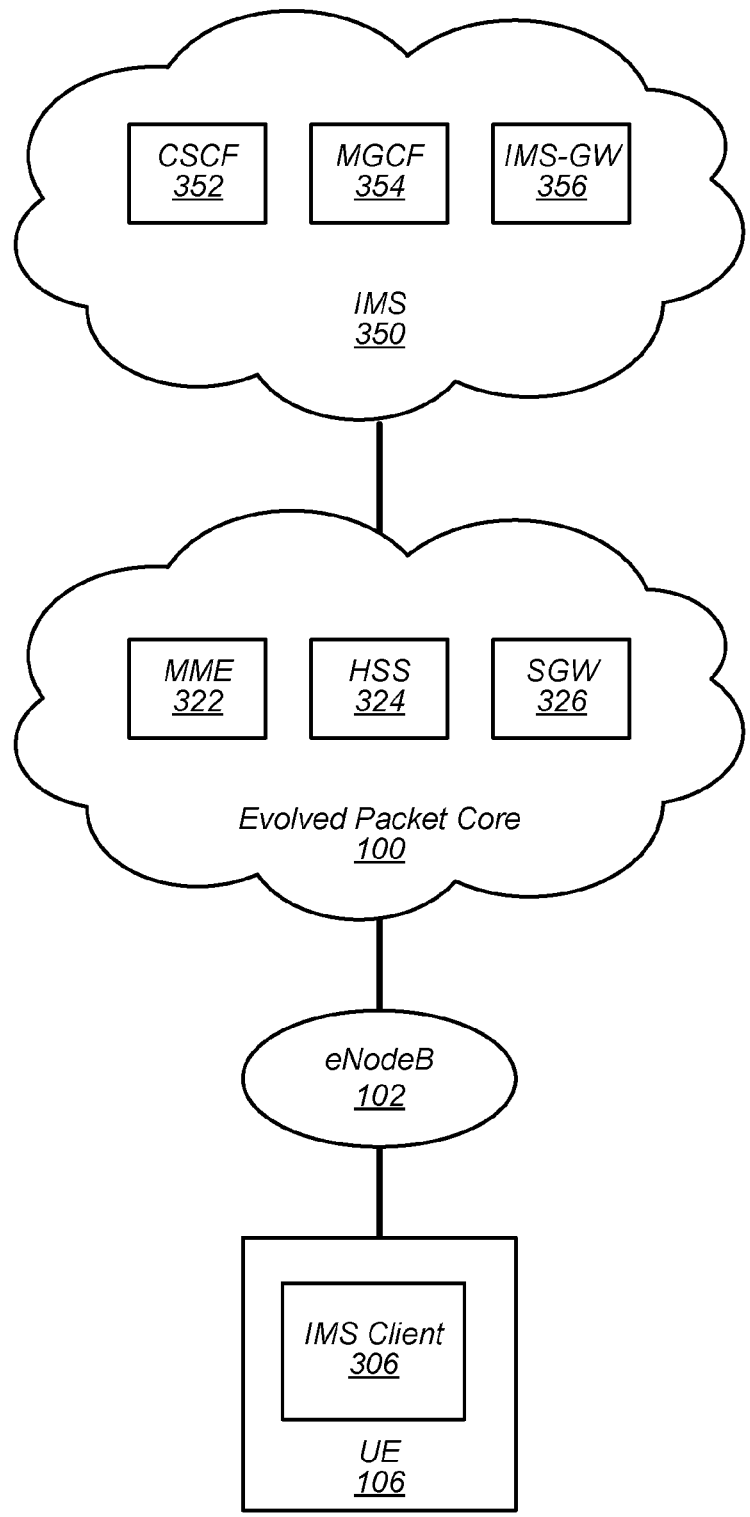
FIG. 3 illustrates an exemplary wireless communication system which may be used for voice over IP, according to some embodiments.

FIGS. 1-3—Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs) or wireless communication technologies, such as GSM, UMTS (WCDMA, TD-SCDMA), LTE, LTE-Advanced (LTE-A), HSPA, 3GPP2 CDMA2000 (e.g., 1xRTT, 1xEV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may provide a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N). The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

In some embodiments, the UE 106 may be configured to communicate using any of multiple radio access technologies/wireless communication protocols. For example, the UE 106 may be configured to communicate using two or more of GSM, UMTS, CDMA2000, LTE, LTE-A, WLAN/Wi-Fi, or GNSS. Other combinations of wireless communication technologies are also possible.

The UE 106 may include one or more antennas for communicating using one or more wireless communication protocols or technologies. In one embodiment, the UE 106 might be configured to communicate using either of CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1xRTT (or LTE or GSM), and separate radios for communicating using each of Wi-Fi and Bluetooth. Other configurations are also possible.

FIG. 3 illustrates an exemplary, simplified portion of a wireless communication system that may be particularly useful for implementing voice over internet protocol (VoIP) communication, such as voice over LTE (VoLTE) in an LTE network. Note that, as used herein, the term "VoLTE" may include voice services over present and/or future versions of LTE, for example including LTE-A.

As shown, the UE 106 may include an internet protocol (IP) multimedia subsystem (IMS) client 306, e.g., which may be implemented in various manners, using hardware and/or software. For example, in one embodiment, software and/or hardware may implement an IMS stack that may provide desired IMS functionalities, e.g., including registration, AKA authentication with IPSec support, session setup and resource reservations, etc.

The UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

The EPC 100 may be in communication with the IMS 350. The IMS 350 may include call session control function (CSCF) 352, which may itself include a proxy CSCF (P-CSCF), interrogating CSCF (I-CSCF), and serving CSCF (S-CSCF), as desired. The IMS 350 may also include media gateway controller function (MGCF) 354 and IMS management gateway (IMS-MGW) 356. The IMS 350 may include various other devices and/or entities known to those skilled in the art as well.

Thus, the system of FIG. 3 illustrates an exemplary portion of a data pathway which may be used for voice over IP communication, e.g., VoLTE.

Figure 4:
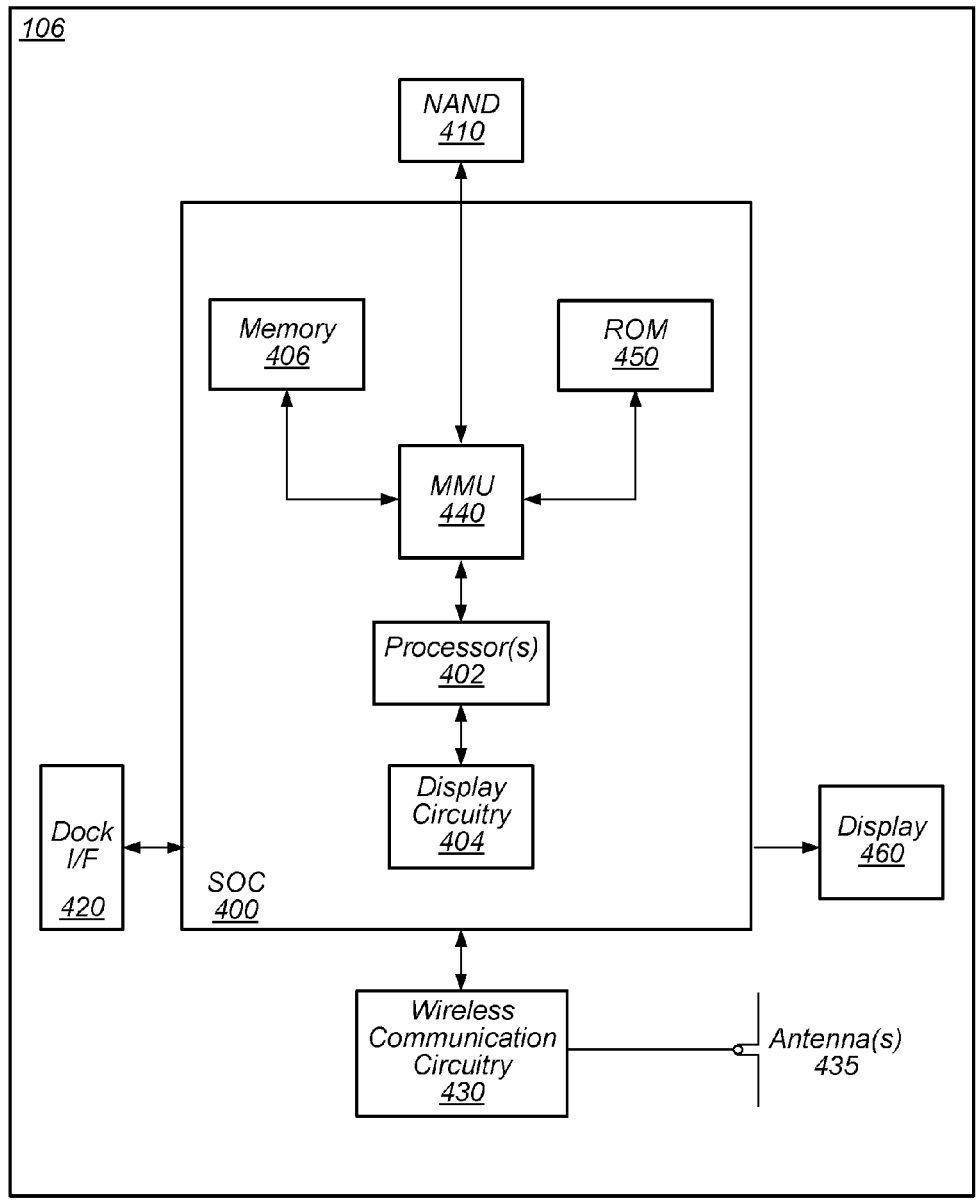
FIG. 4 illustrates an exemplary block diagram of a UE, according to some embodiments.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430 (e.g., including one or more radios), connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 435 to perform the wireless communication.

The UE 106 may also include and/or be configured for use with one or more user interface elements. The user interface elements may include any of various elements, such as display 460 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described herein, the UE 106 may include hardware and software components for implementing features for communicating using one or more wireless communication technologies, such as those described herein. The processor 402 of the UE device 106 may be configured to implement part or all of the features described herein, e.g., by executing program instructions stored on a memory medium (e.g., a non-tansitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
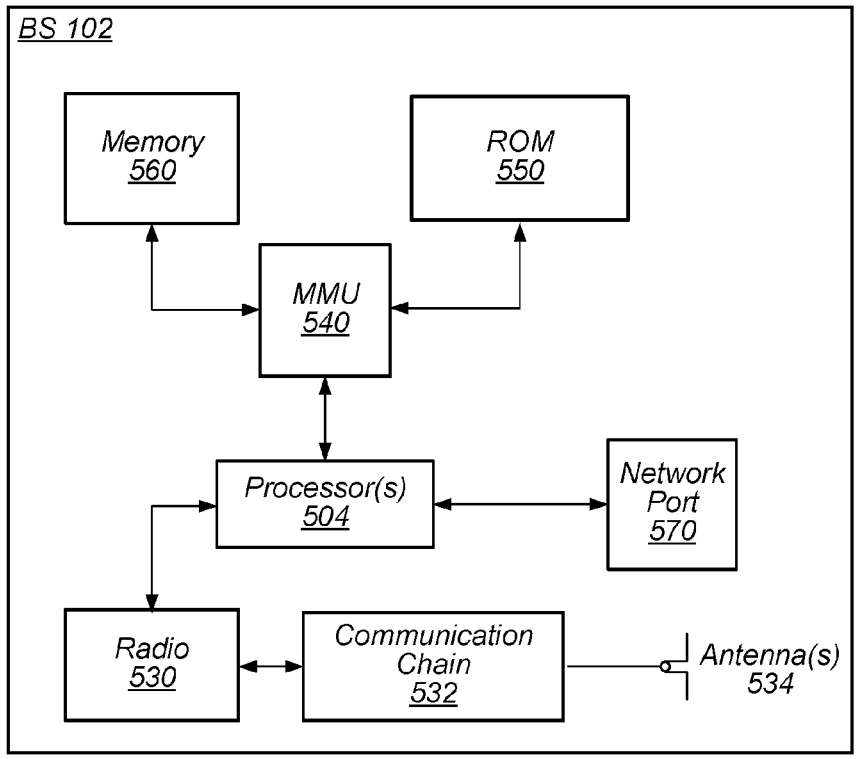
FIG. 5 illustrates an exemplary block diagram of a BS, according to some embodiments.

FIG. 5—Base Station

FIG. 5 illustrates an exemplary block diagram of a base station 102. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna(s) 534 communicates with the radio 530 via communication chain 532. Communication chain 532 may be a receive chain, a transmit chain or both. The radio 530 may be configured to communicate via various wireless communication technologies, including, but not limited to, LTE, GSM, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
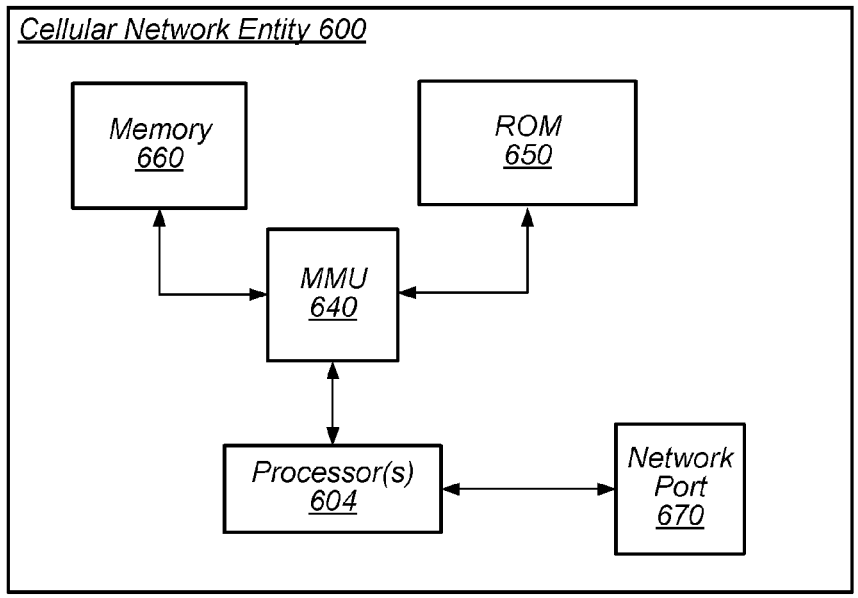
FIG. 6 illustrates an exemplary block diagram of a network entity.

FIG. 6—Network Entity

FIG. 6 illustrates an exemplary block diagram of a device 600 capable of providing a cellular network entity, according to some embodiments. It is noted that the device 600 of FIG. 6 is merely one example of a possible device that may provide a cellular network entity. As shown, the device 600 may include processor(s) 604 which may execute program instructions for the device 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The device 600 may include at least one network port 670. The network port 670 may be configured to couple to one or more base stations and/or other cellular core network entities and/or devices.

The device 600 may provide a MME, a P-CSCF, a S-CSCF, and/or any of various other possible cellular network entities.

The device 600 may communicate with base stations (e.g., eNBs) and/or other core network entities/devices by means of any of various communication protocols and/or interfaces.

The processor(s) 604 of the device 600 may be configured to implement part or all of the methods described herein, e.g., by executing program instructions stored on a memory medium (e.g., a non-transitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
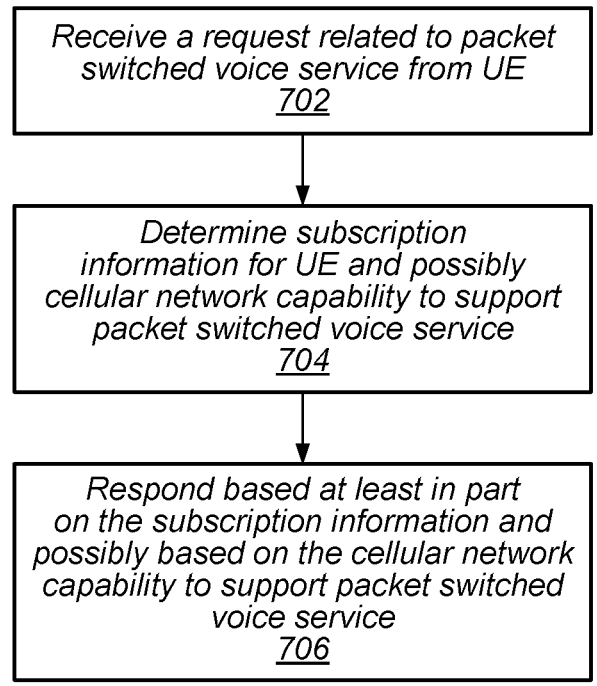
FIGS. 7-8 are flowchart diagrams illustrating exemplary methods for reducing signaling overhead associated with packet switched voice service registration.
Figure 8:
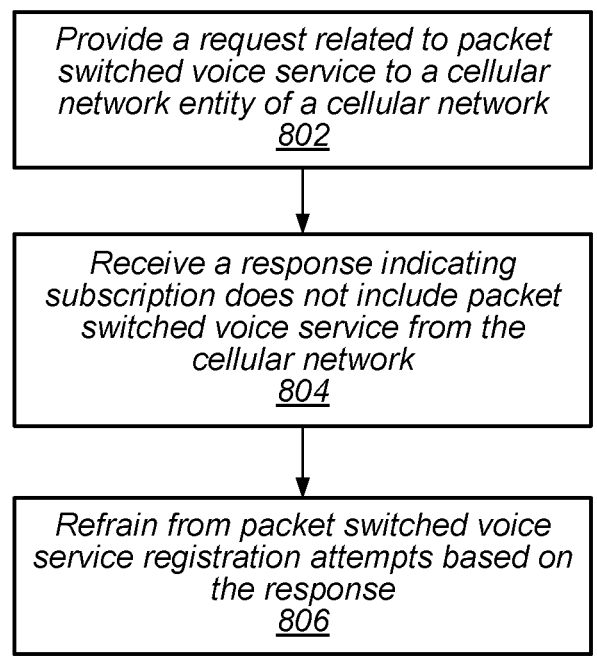

FIGS. 7-8—Flowcharts

In many instances a wireless device may indicate a preference for packet switched (PS) voice service (for example, VoLTE service) when attaching to a cellular network. The cellular network may commonly respond based on the capability of the network to support packet switched voice service, e.g., without regard to the subscription characteristics of the wireless device attaching to the network. As a result, the network may indicate that packet switched voice service is supported and provide information that the wireless device would use to register for packet switched voice service as long as the network device capability supports such service.

A wireless device with a preference for packet switched voice service (e.g., according to a default configuration or based on user preferences, among various possibilities) may use such information to attempt to register for packet switched voice service from the network. For example, in an LTE context, a MME responding to an attach request or packet data network (PDN) connectivity request might provide a P-CSCF address list to the UE during IMS PDN connection establishment, and the wireless device might attempt session initation protocol (SIP) registration with a P-CSCF for which an address was provided by the network. If the wireless device does not have a packet switched voice service (e.g., VoLTE) subscription from the network, the network may deny the SIP registration attempt (e.g., with a SIP 403 forbidden message). The wireless device may then refrain from trying to perform SIP registration with the same P-CSCF address, but may try, unsuccessfully, to perform SIP registration with each other P-CSCF address provided by the MME. The signaling overhead from such unsuccessful attempts to register for packet switched voice service may be a substantial burden to the cellular network, and may cause unnecessary power consumption at the wireless device. Techniques for reducing or avoiding signaling overhead relating to packet switched voice service when a wireless device is not subscribed to such services may thus be beneficial to both cellular networks and wireless devices, at least according to some embodiments.

FIGS. 7-8 are flowchart diagrams illustrating methods for reducing signaling overhead associated with registration for packet switched voice service. The methods of FIGS. 7-8 may be used in conjunction with any of the computer systems or devices shown in the above Figures, among other devices. As one possibility, the method of FIG. 7 may be implemented by a cellular network entity, such as might be provided by the device 600 illustrated in FIG. 6, while the method of FIG. 8 may be implemented by a wireless user equipment (UE) device, such as the UE device 106 illustrated in any of FIGS. 1-4. Note that while the schemes shown in FIGS. 7-8 may be used in conjunction with LTE systems as one possibility, it may also be possible to use such a scheme (or a variation thereon) in conjunction with any of various other cellular systems, as desired.

Note that in various embodiments, some of the elements of the method shown may be performed concurrently, in a different order than shown, or may be omitted. Additional elements may also be performed as desired. As shown, the methods may operate as follows.

In 702, a request relating to packet switched voice service may be received from a wireless user equipment (UE) device. The request may be received by a cellular network entity associated with a cellular network. The request may be any of multiple possible types of requests.

As one possibility, the request may be an attach request or a tracking area update (TAU) request, and may be received by a MME of the cellular network. For example, the UE device may provide such a request upon initially attaching to a network, or upon moving from one tracking area (TA) to another TA, or from one public land mobile network (PLMN) to another PLMN. In such a case, the request may include an indication of a preference for packet switched voice service. For example, the request may include various fields for indicating UE preferences and/or characteristics of the attach/TAU request, and the UE might indicate that the UE has voice centric usage setting, that the UE has a preference for the packet switched PS domain for voice communication, that the UE has a preference for the PS domain for SMS communication, and/or any of various other preferences and/or characteristics. The UE may also or alternatively include a request for P-CSCF address(es) for the cellular network, e.g., in order to facilitate registration for packet switched voice service from the network.

As a further possibility, the request may be a standalone PDN connectivity request. For example, if the attach access point network (APN) is not an IMS APN, the UE device may (e.g., at a later time) initiate a PDN connectivity request to obtain connectivity to an IMS APN.

As another possibility, the request may be a SIP register request, and may be received by a P-CSCF of the cellular network. In such a case, the UE might have already attached to the cellular network (e.g., might have already sent an attach request and received an attach accept message), have an IP address, and know the IP address of one or more P-CSCFs of the cellular network (e.g., including the P-CSCF to which the SIP register request is directed).

In 704, subscriber information for the UE device may be determined. The subscriber information may be obtained from a HSS of the cellular network. The subscriber information may include an indication of whether the UE device is subscribed to packet switched voice service from the cellular network. At least in some instances, the subscriber information may be specific to a current TA of the UE device, since for example it may be the case that a UE device is subscribed to packet switched voice service from a cellular network in one or more TAs, and not subscribed to packet switched voice service from the cellular network in one or more other TAs. Thus, it may be determined whether the subscription information for the UE device indicates that packet switched voice service from the cellular network is permitted to the UE device (e.g., in the current TA of the UE device and/or more generally).

Note that at least in some instances, it may also be determined whether the cellular network entity (and/or the cellular network generally) is capable of supporting packet switched voice service. For example, it may be determined whether cellular network infrastructure capable of providing packet switched voice service, such as VoLTE service, is available in the current TA of the UE device.

In 706, a response based at least in part on the subscription information may be provided. The nature of the response may depend on the nature of the request. At least in some instances, the response may also be based at least in part on whether the cellular network entity (and/or the cellular network generally) is capable of supporting packet switched voice service.

As one possibility, the response may be an attach accept message provided by a MME in response to an attach request, or alternatively a tracking area update accept message provided by a MME in response to a tracking area update request. If the UE is subscribed to packet switched voice service from the cellular network and the cellular network is capable of supporting packet switched voice service, the response may indicate that packet switched voice service is permitted. For example, an IMS VoPS indicator value of 1 may be provided in the attach response in this case, in some embodiments. If the UE is not subscribed to packet switched voice service from the cellular network, the response may indicate that packet switched voice service is not permitted (e.g., possibly even if the cellular network is capable of supporting packet switched voice service). For example, an IMS VoPS indicator value of 0 may be provided in the attach response in this case, in some embodiments. In such a case, the UE may not attempt to register from packet switched voice service from the cellular network. As another example, e.g., if the cellular network is capable of supporting packet switched voice service but the UE is not subscribed to packet switched voice service from the cellular network, an IMS VoPS indicator value of 1 might be provided, but an invalid or void P-CSCF address may be provided to the UE as an indication that the UE is not subscribed to packet switched voice service from the cellular network. In such a case, the UE may be able to recognize the invalidity of the invalid or void P-CSCF address and not attempt to register for packet switched voice service from the cellular network. Note that as another possibility, such an invalid or void P-CSCF address may be provided to the UE as an indication that the UE is not subscribed to packet switched voice service from the cellular network in response to a standalone IMS PDN connectivity request.

As another possibility, the response may be a SIP registration response provided by a S-CSCF (e.g., possibly by way of a P-CSCF) in response to a SIP register request. If the UE is subscribed to packet switched voice service from the cellular network, the response may allow registration to proceed. If the UE is not subscribed to packet switched voice service from the cellular network, the response may reject the registration attempt. For example, a SIP 403 forbidden message may be provided to the UE as the response. As part of the response, a cause code indicating that a reason the registration attempt was rejected is that the UE is not subscribed to packet switched voice service from the cellular network may be included. This may allow the UE to determine not to make further attempts to register for packet switched voice service from the cellular network.

Thus, at least in some instances, if the subscription of the UE device does not include packet switched voice service from the cellular network, the response may indicate that the subscription of the UE device does not include packet switched voice service from the cellular network. This may allow the UE device to refrain from attempting (or making further attempts) to register for packet switched voice service from the cellular network, and potentially avoid the power consumption and signaling overhead associated with such registration attempts.

In 802, a request related to packet switched voice service may be provided by a UE device to a cellular network entity of a cellular network. The request may be any of multiple possible types of requests.

As one possibility, the request may be an attach request or a TAU request, and may be provided to a MME of the cellular network. For example, the UE device may provide such a request upon initially attaching to a network, or upon moving from one tracking area (TA) to another TA. In such a case, the request may include an indication of a preference for packet switched voice service. For example, the request may include various fields for indicating UE preferences and/or characteristics of the attach/TAU request, and the UE might indicate that the UE has voice centric usage setting, that the UE has a preference for the PS domain for voice communication, that the UE has a preference for the PS domain for SMS communication, and/or any of various other preferences and/or characteristics. The UE may also or alternatively include a request for P-CSCF address(es) for the cellular network, e.g., in order to facilitate registration for packet switched voice service from the network.

As a further possibility, the request may be a standalone PDN connectivity request. For example, if the attach access point network (APN) is not an IMS APN, the UE device may (e.g., at a later time) initiate a PDN connectivity request to obtain connectivity to an IMS APN.

As another possibility, the request may be a SIP register request, and may be provided to a P-CSCF of the cellular network. In such a case, the UE might have already attached to the cellular network (e.g., might have already sent an attach request and received an attach accept message), have an IP address, and know the IP address of one or more P-CSCFs of the cellular network (e.g., including the P-CSCF to which the SIP register request is directed).

In 804, a response indicating that a subscription of the UE device does not include packet switched voice service from the cellular network may be received. The nature of the response may depend on the nature of the request.

As one possibility, the response may be an attach accept message provided by a MME in response to an attach request, or alternatively a tracking area update accept message provided by a MME in response to a tracking area update request. In such a case, e.g., if the cellular network is capable of supporting packet switched voice service but the UE is not subscribed to packet switched voice service from the cellular network, the response may include a IMS VoPS indicator value of 1, but may also include an invalid or void P-CSCF address as an indication that the UE is not subscribed to packet switched voice service from the cellular network. Note that as another possibility, such an invalid or void P-CSCF address may be received by the UE as an indication that the UE is not subscribed to packet switched voice service from the cellular network in response to a standalone IMS PDN connectivity request. As a further possibility, the response may indicate more generally that packet switched voice service is not permitted (e.g., possibly even if the cellular network is capable of supporting packet switched voice service). For example, an IMS VoPS indicator value of 0 may be provided in the attach/TAU response in this case, in some embodiments.

As another possibility, the response may be a SIP registration response provided by a S-CSCF (e.g., possibly by way of a P-CSCF) in response to a SIP register request. In such a case, as the UE is not subscribed to packet switched voice service from the cellular network, the response may reject the registration attempt. For example, a SIP 403 forbidden message may be provided to the UE as the response. As part of the response, a cause code indicating that a reason the registration attempt was rejected is that the UE is not subscribed to packet switched voice service from the cellular network may be included.

In 806, the UE device may refrain (at least temporarily) from packet switched voice service registration attempts (at least with the cellular network) based on the response. For example, the UE device may recognize that an invalid P-CSCF address included in an attach/TAU response or a response to a standalone IMS PDN connectivity request is invalid, determine that the subscription of the UE does not include packet switched voice service from the cellular network based on the P-CSCF address being invalid, and refrain from attempting SIP registration using the invalid P-CSCF address based on recognizing the invalid P-CSCF address as invalid. As another example, the UE device may recognize that a cause code included with a SIP forbidden message indicates that the subscription of the UE device does not include packet switched voice service from the cellular network and determine not to perform further SIP registration attempts with the cellular network based at least in part on the cause code indicating that the subscription of the UE device does not include packet switched voice service from the cellular network.

As noted above, at least in some embodiments the UE refraining from attempting to register for packet switched voice service may be temporary. According to various embodiments, any of a variety of possible conditions may trigger resumption of packet switched voice service registration attempts. For example, the UE device might resume allowing packet switched voice service registration attempts if a timer associated with refraining from attempting to register for packet switched voice service expires, if the UE device attaches to a different cellular network (e.g., since the UE's subscription characteristics may be different with the new network), if the UE device changes tracking areas (e.g., in case the subscription characteristics of the UE differ in the new tracking area), if the UE device (or possible just a cellular radio of the UE device) powers off and on again, and/or if any of various other possible conditions for resuming allowing packet switched voice service registration attempts are detected, e.g., depending on the device configuration.

Figure 9:
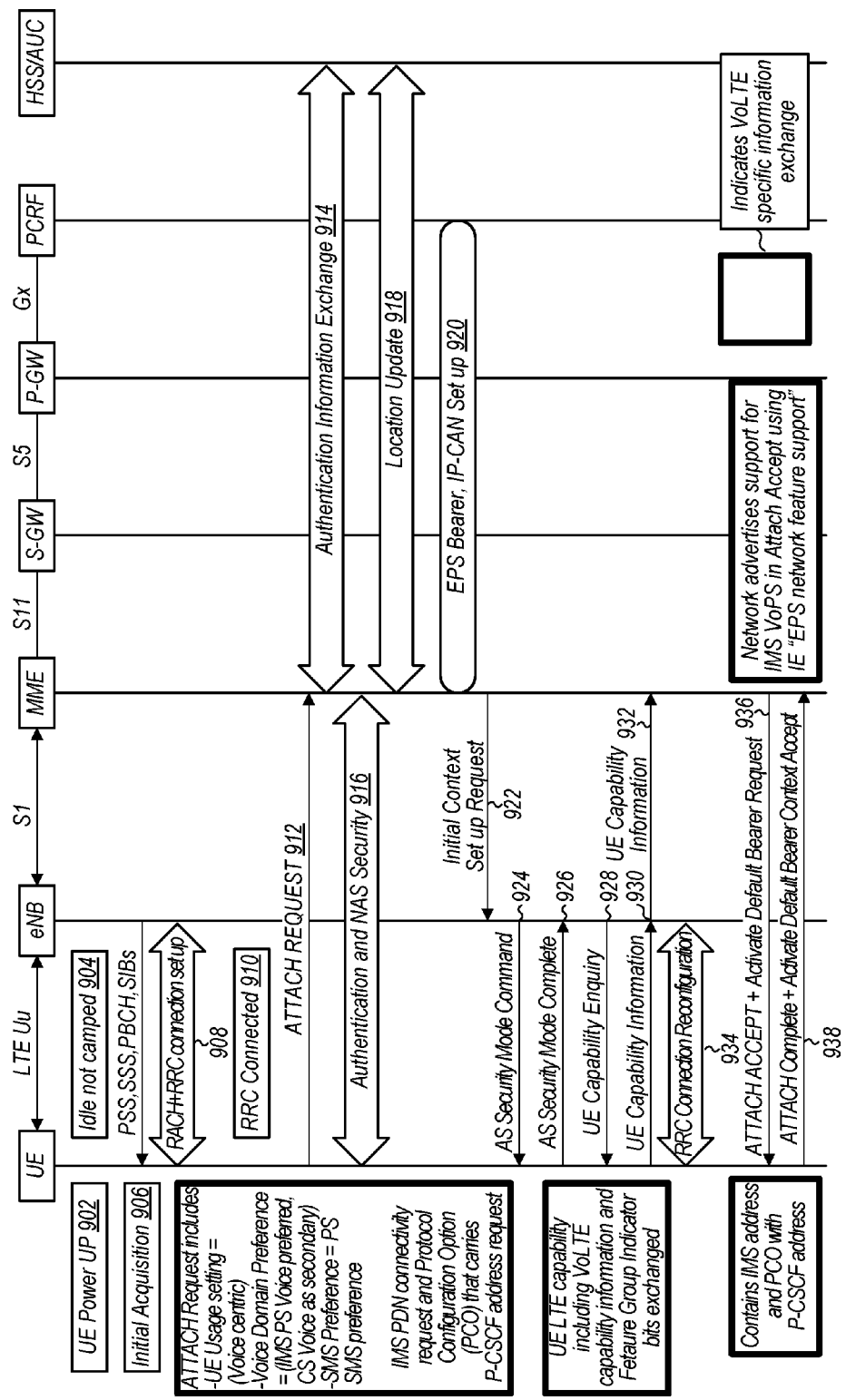
FIGS. 9-11 illustrate exemplary aspects of VoLTE registration flow, according to some embodiments.
Figure 10:
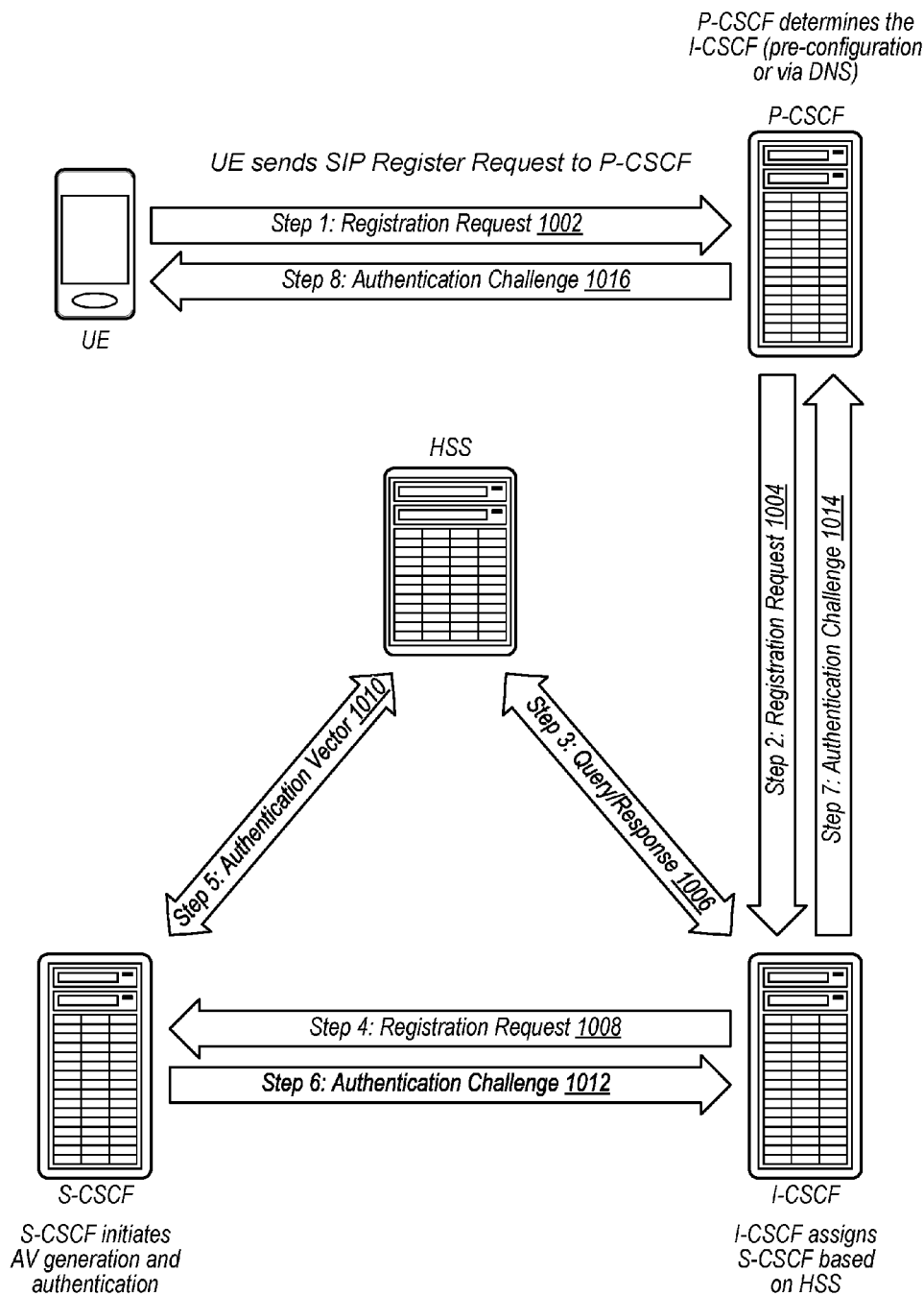
Figure 11:
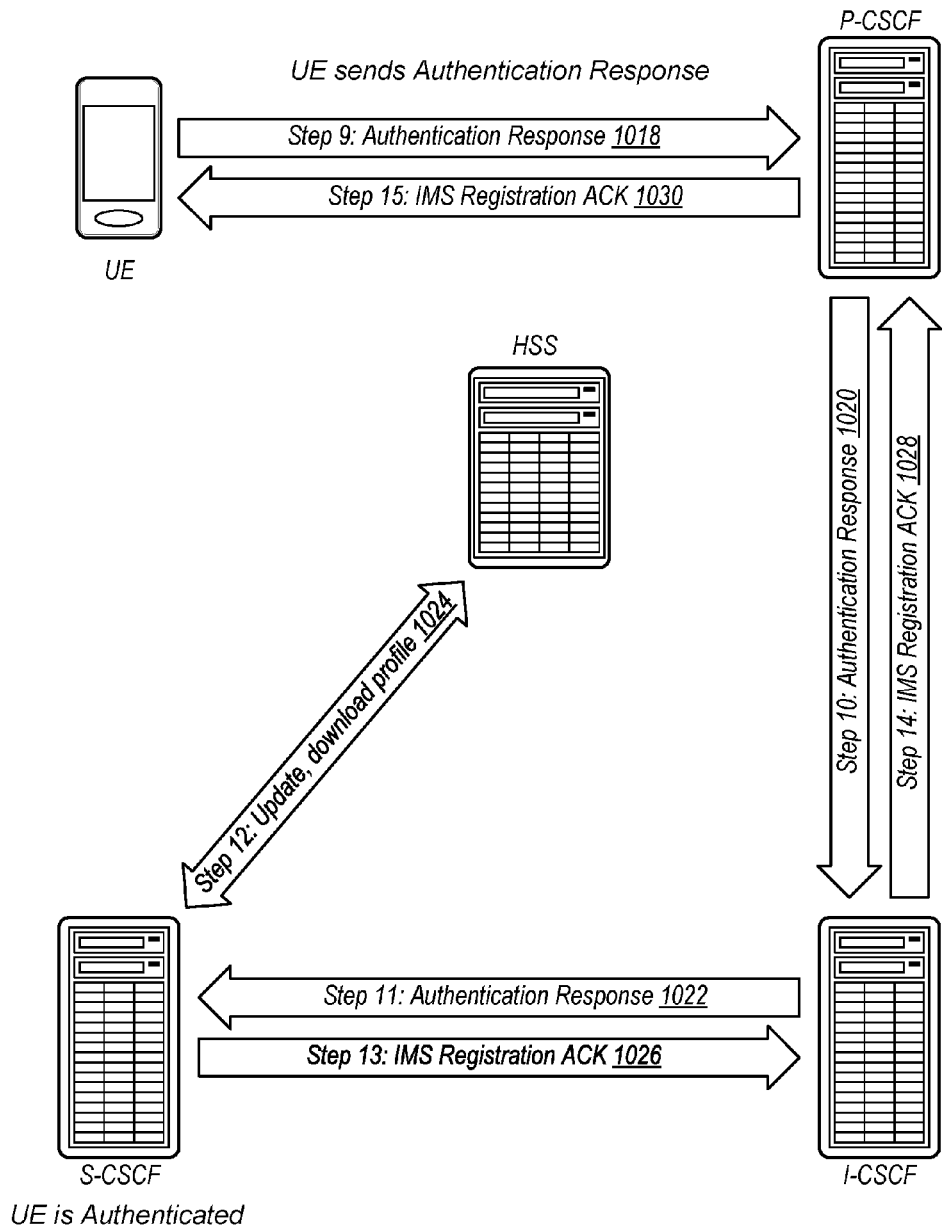

FIGS. 9-11 VoLTE Registration Flow Example

FIGS. 9-11 illustrate examples of communication flow between a UE device and various cellular network entities for VoLTE registration, such as might be used in conjunction with either or both of the methods of FIGS. 7-8 according to some embodiments. It should be noted while the exemplary details illustrated in and described with respect to FIGS. 9-11 may be representative of certain features that may be used in conjunction with VoLTE registration techniques, other features are also possible. Accordingly, the features of FIGS. 9-11 are not intended to be limiting to the disclosure as a whole: numerous variations and alternatives to the details provided herein below are possible and should be considered within the scope of the disclosure.

FIG. 9 illustrates an example communication flow between a UE device and network entities from powering the UE device on through attachment to the cellular network, in which VoLTE specific information is exchanged. As shown, information regarding possible VoLTE specific information exchanges shown in FIG. 9 is highlighted using heavy bold outlines.

As shown, upon powering up (902), the UE device may be idle and not camped on any cellular network (904). The UE device may perform initial acquisition (906), scanning the primary synchronization sequence (PSS), secondary synchronization sequence (SSS), physical broadcast channel (PBCH), and system information blocks (SIBs) to obtain network timing information and the information needed to attach to the network. Once initial acquisition is complete, the UE device may perform a random access procedure (RACH) with a serving base station (e.g., an eNodeB operating according to LTE) to attempt to set up a radio resource control (RRC) connection (908).

Once a radio link has been established and the UE device is in RRC connected mode (910), the UE device may send an attach request (912) as an initial non-access stratum (NAS) message, which (as shown) may be provided to a MME of the network. The attach request may request permission to attach to the cellular network, include any of a variety of information (e.g., potentially depending on a type of attach request being made). As shown, the information may include a UE usage setting (which may for example be set to "voice centric"), a voice domain preference (which may for example be set to IMS PS voice as a first preference, with CS voice as a secondary preference), and/or a short messaging service (SMS) preference (which may for example be set to PS). The attach request may, at least in some embodiments, also include an IMS packet data network (PDN) connectivity request and protocol configuration option (PCO) that carriers a P-CSCF address request. Note that alternatively (or in addition), a UE device may provide a standalone IMS PDN connectivity request at a different time than during an attach or TAU request. For example, a PDN connectivity request included with an attach request might bring up a traffic APN, and a later standalone PDN connectivity request might be used to bring up an IMS APN.

Based on the attach request, the MME may perfom an authentication information exchange (914) with a home subscriber server (HSS) and/or authentication center (AUC) of the cellular network. This information exchange may allow the MME to ascertain whether to allow the UE device to attach, and possibly what subset of services to permit to the UE device, e.g., depending on the subscription characteristics of the UE device. The MME may follow up the authentication information exchange by performing authentication and NAS security procedures (916) with the UE device itself. Once these procedures are complete, the MME may provide a location update (918) regarding the UE device to the HSS/AUC. The MME may then proceed to set up an evolved packet system (EPS) bearer and perform IP connectivity access network (IP-CAN) set up (920) with the policy and charging rules function (PCRF) of the network.

The MME may then provide an initial context set up request (922) to the serving base station of the UE device. The base station may provide an access stratum (AS) security mode command (924) to the UE device, which may respond with an AS security mode complete message (926). The base station may then send a UE capability enquiry (928) to the UE device, which may respond with UE capability information (930). As shown, the UE capability information exchange may include exchange of VoLTE capability information and feature group indicator bits. The base station may provide the received UE capability information to the MME (932). At this point, RRC connection reconfiguration (934) may be performed between the serving base station and the UE device. The MME may send an attach accept message to the UE device and activate a default bearer request (936). The network may advertise support for IMS VoPS in the attach accept message, for example using the "EPS network feature support" information element. Further, the attach accept message may include an IMS address and a PCO with one or more P-CSCF addresses. The UE device may finish the attach procedure by providing an attach complete message and accepting the activate default bearer context (938).

FIGS. 10-11 illustrate an example communication flow for SIP registration and authentication for IMS service between a UE device various cellular network entities. The UE may have acquired an IP address via an attach procedure (e.g., such as illustrated in and described with respect to FIG. 9), and may know the P-CSCF IP address, so the communication flow may begin, as illustrated in FIG. 10, with the UE constructing and send an SIP register message to the P-CSCF (1002). The P-CSCF may determine an I-CSCF (via pre-configuration or DNS) and send a registration request for the UE device to the I-CSCF (1004). The I-CSCF may query and receive a response from the HSS (1006). The I-CSCF may assign a S-CSCF for the UE device based on the HSS response, and may send a registration request for the UE device to the assigned S-CSCF (1008). The S-CSCF may then initiate AV generation and authentication, exchanging an authentication vector with the HSS (1010) and providing an authentication challenge to the I-CSCF (1012). The authentication challenge may be propagated to the P-CSCF (1014) and on to the UE device (1016).

The communication flow may continue, as illustrated in FIG. 11, with the UE providing an authentication response to the P-CSCF (1018). The authentication response may be provided from the P-CSCF to the I-CSCF (1020) and from the I-CSCF to the S-CSCF (1022). The UE may at this point be authenticated, and the S-CSCF may update the HSS accordingly and download the UE profile from the HSS (1024). The S-CSCF may then provide an IMS registration acknowledgement (ACK) to the I-CSCF (1026), which may in turn provide the IMS registration ACK to the P-CSCF (1028), which may further in turn provide the IMS registration ACK to the UE device (1030). The IMS registration of the UE device may at this point be complete.

In the following further exemplary embodiments are provided.

One set of embodiments may include a device providing a cellular network entity, the device comprising: a network interface; and a processing element operably coupled to the network element; wherein the network interface and the processing element are configured to: receive a request relating to packet switched voice service from a wireless user equipment (UE) device; determine that a subscription of the UE device does not include packet switched voice service from a cellular network associated with the cellular network entity; and provide a response indicating that the subscription of the UE device does not include packet switched voice service from the cellular network.

According to some embodiments, the cellular network entity comprises a mobility management entity (MME), wherein the request comprises an attach request or a tracking area update request with an indication of a preference for packet switched voice service.

According to some embodiments, the response comprises an indicator value indicating that packet switched voice service is not available from the cellular network based on the subscription of the UE device not including packet switched voice service from the cellular network.

According to some embodiments, the response comprises an invalid call session control function address as an indication that the subscription of the UE device does not include packet switched voice service from cellular network.

According to some embodiments, the network interface and the processing element are further configured to: determine whether the cellular network associated with the cellular network entity is capable of supporting packet switched voice service; and respond to requests relating to packet switched voice service also based at least in part on whether the cellular network associated with the cellular network entity is capable of supporting packet switched voice service.

According to some embodiments, the cellular network entity comprises a call session control function (CSCF), wherein the request comprises a session initiation protocol (SIP) registration request, wherein the response indicating that the subscription of the UE device does not include packet switched voice service from the cellular network comprises an SIP registration rejection response with a cause code indicating that the subscription of the UE device does not include packet switched voice service from the cellular network.

According to some embodiments, the SIP registration rejection response comprises a 403 forbidden response.

According to some embodiments, the packet switched voice service comprises voice over LTE (VoLTE) service.

A further set of embodiments may include a method, comprising: by a cellular network entity: receiving a request from a wireless user equipment (UE) device, wherein the request relates to packet switched voice service; determining whether subscription information for the UE device indicates that packet switched voice service from the cellular network is permitted to the UE device; providing a response to the request indicating whether packet switched voice service from the cellular network is available to the UE device, wherein the response is generated based at least in part on the subscription information.

According to some embodiments, the response is also generated based at least in part on whether the cellular network is capable of supporting packet switched voice service.

According to some embodiments, the response indicates that packet switched voice service is not permitted if the subscription information for the UE device indicates that packet switched voice service from the cellular network is not permitted to the UE device, wherein the response indicates that packet switched voice service is permitted if the subscription information for the UE device indicates that packet switched voice service from the cellular network is permitted to the UE device and the cellular network is capable of supporting packet switched voice service.

According to some embodiments, the response indicates an invalid proxy call session control function (P-CSCF) address if the subscription information for the UE device indicates that packet switched voice service from the cellular network is not permitted to the UE device.

According to some embodiments, the response comprises a cause code indicating that the UE device is not subscribed to packet switched voice service from the cellular network.

According to some embodiments, the request comprises one of: an attach request with an indication of a preference for packet switched voice service; a tracking area update request with an indication of a preference for packet switched voice service; an interne protocol multimedia subsystem (IMS) packet data network (PDN) connectivity request; or a session initiation protocol (SIP) register request.

Yet another set of embodiments may include a wireless user equipment (UE) device, comprising: a radio; and a processing element operably coupled to the radio; wherein the radio and the processing element are configured to: provide a request relating to packet switched voice service to a cellular network entity associated with a cellular network; receive a response indicating that a subscription of the UE device does not include packet switched voice service from the cellular network; and refrain, at least temporarily, from packet switched voice service registration attempts with the cellular network based on the response indicating that the subscription of the UE device does not include packet switched voice service from the cellular network.

According to some embodiments, the request comprises an attach request or a tracking area update request comprising an indication that packet switched voice service is preferred, wherein the cellular network entity comprises a mobility management entity (MME), wherein the response comprises an invalid proxy call session control function (P-CSCF) address.

According to some embodiments, the radio and the processing element are configured to: recognize that the invalid P-CSCF address is invalid; and determine that the subscription of the UE does not include packet switched voice service from the cellular network based on the P-CSCF address being invalid.

According to some embodiments, the request comprises a session initiation protocol (SIP) register message, wherein the cellular network entity comprises a serving call session control function (S-CSCF), wherein the response comprises a SIP forbidden message comprising a cause code indicating that the subscription of the UE device does not include packet switched voice service from the cellular network.

According to some embodiments, the radio and the processing element are further configured to: determine to not perform further SIP registration attempts with the cellular network based at least in part on the cause code indicating that the subscription of the UE device does not include packet switched voice service from the cellular network.

According to some embodiments, the radio and the processing element are futher configured to: resume allowing packet switched voice service registration attempts if one or more conditions for resuming allowing packet switched voice service registration attempts are detected.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, comprising:

a radio; and a processing element operably coupled to the radio;

wherein the radio and the processing element are configured to:

provide a request relating to packet switched voice service to a cellular network entity associated with a cellular network;

receive a response comprising an invalid proxy call session control function (P-CSCF) address;

recognize that the invalid P-CSCF address is invalid;

determine that the subscription of the UE does not include packet switched voice service from the cellular network based on the P-CSCF address being invalid; and refrain, at least temporarily, from packet switched voice service registration attempts with the cellular network based on the determination that the subscription of the UE device does not include packet switched voice service from the cellular network.

2. The UE device of claim 1,
wherein the request comprises an attach request or a tracking area update request comprising an indication that packet switched voice service is preferred, wherein the cellular network entity comprises a mobility management entity (MME).

3. The UE device of claim 1,
wherein the request comprises a session initiation protocol (SIP) register message, wherein the cellular network entity comprises a serving call session control function (S-CSCF).

4. The UE device of claim 1, wherein the radio and the processing element are further configured to:
resume allowing packet switched voice service registration attempts if one or more conditions for resuming allowing packet switched voice service registration attempts are detected.

5. The UE device of claim 1,
wherein the packet switched voice service comprises voice over LTE (VoLTE) service.

6. An apparatus for managing a wireless user equipment device (UE), the apparatus comprising:
a processing element configured to cause the UE to:
provide a request relating to packet switched voice service to a cellular network entity associated with a cellular network;
receive a response comprising an invalid proxy call session control function (P-CSCF) address;
recognize that the invalid P-CSCF address is invalid;
determine that the subscription of the UE does not include packet switched voice service from the cellular network based on the P-CSCF address being invalid; and
refrain, at least temporarily, from packet switched voice service registration attempts with the cellular network based on the determination that the subscription of the UE device does not include packet switched voice service from the cellular network.

7. The apparatus of claim 6,
wherein the request comprises an attach request or a tracking area update request comprising an indication that packet switched voice service is preferred, wherein the cellular network entity comprises a mobility management entity (MME).

8. The apparatus of claim 6,
wherein the request comprises a session initiation protocol (SIP) register message, wherein the cellular network entity comprises a serving call session control function (S-CSCF).

9. The apparatus of claim 6,
wherein the processing element is further configured to:
resume allowing packet switched voice service registration attempts if one or more conditions for resuming allowing packet switched voice service registration attempts are detected.

10. The apparatus of claim 6,
wherein the packet switched voice service comprises voice over LTE (VoLTE) service.

11. A method for managing a wireless user equipment device (UE), the method comprising:
at the UE:
providing a request relating to packet switched voice service to a cellular network entity associated with a cellular network;
receiving a response comprising an invalid proxy call session control function (P-CSCF) address;
recognizing that the invalid P-CSCF address is invalid;
determining that the subscription of the UE does not include packet switched voice service from the cellular network based on the P-CSCF address being invalid; and
refraining, at least temporarily, from packet switched voice service registration attempts with the cellular network based on the determination that the subscription of the UE device does not include packet switched voice service from the cellular network.

12. The method of claim 11,
wherein the request comprises an attach request or a tracking area update request comprising an indication that packet switched voice service is preferred, wherein the cellular network entity comprises a mobility management entity (MME).

13. The method of claim 11,
wherein the request comprises a session initiation protocol (SIP) register message, wherein the cellular network entity comprises a serving call session control function (S-CSCF).

14. The method of claim 11, the method further comprising:
resuming allowing packet switched voice service registration attempts if one or more conditions for resuming allowing packet switched voice service registration attempts are detected.

15. The method of claim 11,
wherein the packet switched voice service comprises voice over LTE (VoLTE) service.

* * * * *